United States Patent
Wintz

[11] Patent Number: 5,938,217
[45] Date of Patent: Aug. 17, 1999

[54] DOLLY FOR MOVING PIANOS AND OTHER HEAVY GOODS

[75] Inventor: Bernard Wintz, Entredozon, France

[73] Assignee: Annecy Electronique, St. Jorioz, France

[21] Appl. No.: 08/683,721

[22] Filed: Jul. 18, 1996

[30] Foreign Application Priority Data

Jul. 26, 1995 [FR] France .................................... 95 09356

[51] Int. Cl.[6] ....................................................... B62B 3/04
[52] U.S. Cl. ........................ 280/79.11; 280/35; 414/495; 414/427
[58] Field of Search .................................... 414/458, 495, 414/426, 427; 280/79.11, 35, 43, 43.12, 43.2, 47.35, 32.6

[56] References Cited

U.S. PATENT DOCUMENTS

| | | | |
|---|---|---|---|
| 1,261,428 | 4/1918 | Norman | 280/35 |
| 1,392,387 | 10/1921 | Wood . | |
| 1,733,043 | 10/1929 | Zelewski . | |
| 2,552,453 | 5/1951 | Pintar | 280/47.35 |
| 2,730,373 | 1/1956 | Blevins et al. | 280/35 |
| 2,763,491 | 9/1956 | Thorwaldson | 280/35 |
| 4,491,452 | 1/1985 | Matovich | 414/427 |
| 4,969,657 | 11/1990 | Kaufmann | 280/79.11 |
| 5,472,219 | 12/1995 | Eckstrum | 280/32.6 |

FOREIGN PATENT DOCUMENTS

A-969 663 12/1950 France .
U-94 13 355 12/1994 Germany .

*Primary Examiner*—Lanna Mai
*Assistant Examiner*—Avraham H. Lerner
*Attorney, Agent, or Firm*—Fay, Sharpe, Beall, Fagan, Minnich & McKee, LLP

[57] ABSTRACT

A load handling dolly (1) assists in the transportation of a load P, such as a piano. A pair of cross-pieces (11, 12) are selectively slid beneath the load, either directly or using an intermediate support plate (17). A pair of side frames (3, 4) are disposed on either side of the load above free ends of the cross-pieces. The cross-pieces are received within extremities or eyelets (13b) of tie rods (13a) which are supported by the side frames for vertical movement by rotating a nut (15). As the nuts are turned, the tie rods, cross-pieces, and the load are lifted, transferring the load to two sets of wheels (5, 6, 7; 8, 9, 10) that rotatably mounted in the side frames.

12 Claims, 10 Drawing Sheets

DOLLY FOR MOVING PIANOS AND OTHER HEAVY GOODS

The present invention concerns a load handling dolly intended for the displacement of a heavy load, which cannot be done manually.

Such dollies are composed, in known fashion, of a platform equipped with wheels below its lower surface, and with the load being arranged on the upper surface of same. This type of platform is, in fact, generally, a pallet composed in its center plane of cleats fixing, between each other, the transverse pathways, into which straps have been introduced at the front and at the rear, forming loops intended to wind around the bodies of two material handlers.

One of the drawbacks of said type of dolly resides in its instability during the operation of depositing the load. In fact, it is apparent that at that particular moment the presence of wheels under the dolly represents a great handicap because they cause it to be mobile from the first contact with the load, which tends to provoke its skidding, or its tipping, with the risk of injury to the material handling personnel and damage to the equipment to be transported, —so much the more, if fragile and delicate objects are involved, which require much precaution, such as, for example, the transport of a piano. In such particular case, specifically if a grand piano is involved, it is first placed edgeways on a pallet on its longest side to proceed with the removal of the legs, after that, it is manually hoisted onto said dolly. Said operation is likewise penalizing for the personnel, since it requires an effort which is not only proportionate to the load, which can reach 400 kilograms, but is also proportionate to the height of the dolly, which is equal to the height of the platform or the pallet, increased by the height of the wheels. One thus understands the difficulty encountered for putting the load in its place.

In addition, the transport of some highly fragile material or object requires that a relatively constant speed is applied to the dolly, without any sudden jerks and stops. But that is practically impossible when pushing by hand is involved. The difficulty also increases if an obstacle must be cleared along the travelling path, for instance, the step of a staircase, or if there is a gap in the slope, constituting an interruption in the ground rolling plane. We are also adding to these comments that the dolly, because of its pivoting wheels, does not allow for a truly controlled trajectory, which, clearly, is an additional significant drawback.

Thus, the material handling dolly according to the invention, intended for the transport of a load, specifically a piano, is of the type comprising longitudinal displacement means permitting displacement of the dolly along a somewhat rectilinear trajectory, parallel to a longitudinal axis, and the load maintenance means permit maintaining said load on the dolly, and it is characterized in that the longitudinal displacement means comprise two lateral side-frames arranged longitudinally, in parallel to the longitudinal axis, —said side-frames forming two sets wheels—having a minimum number of two wheels each, namely, one front wheel and one rear wheel, and being stabilized between each other at time of transport of the load by means of load maintenance means.

According to another characteristic of the invention, the load maintenance means comprise at least two cross-pieces arranged transversely between the side-frame, as a result of connection means, said cross-pieces are independent and removable relative to the side-frames.

According to a preferred embodiment of the invention, each of the side-frames is made up of two parallel guide-bars, arranged longitudinally and determining between them a space in which at least two wheels are mounted in rotation on the corresponding transverse axes of rotation, traversing said guide-bars.

Furthermore, the means of connecting the side-frames with the cross-pieces can comprise at least four tie-bars, which are cooperating with each extremity of said cross-pieces, and which are freely predisposed beneath the side-frames in such manner so as to bring them into contact with the lower edges of the guide-plates of these latter, at the time when there is some traction on the free extremities of the tie-rods, while being supported on the upper edges of the same guide-plates after having traversed same.

According to an additional characteristic, the tie-rods comprise, on the one side, an upper threaded portion, realized at their free extremities, intended to cooperate with the upper edges of the guide-plates of the side-frames, and, on the other side, a portion in the form of a ring, realized at their opposite extremities and intended for free insertion of the extremities of the cross-pieces.

Moreover, the load handling dolly comprises a means of lifting the load intended to permit putting the load into place on said dolly.

According to a preferred embodiment of the invention, the load lifting means comprises a power-driven reducer, exercising tractive action on each of the tie-rods of the same side-frame through the intermediacy of an exit shaft equipped with means of rotating a threaded cylinder with which the free extremity, likewise threaded, of the tie-rod is cooperating in such manner that the rotational thrust of the cylinder from the power-driven reducer on the threaded portion of the tie-rod, previously immobilized from rotation by a cross-piece inserted in its ring at the end, accordingly causes a rising or descending movement of said cross-pieces.

According to another characteristic, the load handling dolly comprises pivoting and/or tilting means for the purpose of permitting the dolly to pivot in order to change direction and/or to vacillate around a more or less transverse axis in such manner so as to promote clearance of an obstacle at time of transport of the load. The pivoting means and tilting means can consist of two intermediary pivoting wheels mounted in rotation facing each other on each of the side-frames, between the front wheel and the rear wheel, and by means of articulation, apt to permit, when required, their alignment relative to the other two or to render them retractable between the guide-plates of said side-frames, or, inversely, to drop them in relationship to the other two.

According to a complementary characteristic, the handling dolly comprises means of propulsion by at least one electrical motor, fed by battery, said motor being installed in mechanical attachment to at least two drive wheels, situated, facing each other, on each side-frame.

The present invention also concerns the characteristics which come to light during the course of the description that follows, and which shall be considered either singly or in accordance with all their possible technical combinations.

Said description is given by way of example only, but is not limited thereto, for better understanding of how the invention can be realized with reference to the attached drawings.

The dolly (1) according to the invention is of the type comprising means of longitudinal displacement (60) for the purpose of permitting the displacement of the dolly according to a more or less rectilinear trajectory, parallel to its longitudinal axis (AA'). It comprises, moreover, pivoting means (61) for the purpose of permitting it to make turns or to nearly pivot in place and tilting means (62) allowing it to tilt forward (AV), backward (AR) around a somewhat transverse axis in order to facilitate negotiating any obstacles, such as stairs or sidewalks.

The means of longitudinal displacement (60) are composed of side-frames (3, 4) forming two sets of lateral, independent wheels (5, 6, 7, . . . 8, 9, 10); said side-frames (3, 4) are stabilized between each other by independent and detachable load holding means (63)—said holding means (63) for the purpose of supporting the load (P) are fixed to the side-frames by means of attachment means (64) at time of construction of the dolly (1).

According to the preferred embodiment of the invention, the dolly (1) is additionally equipped with means of propulsion (65), apt to render it self-propelling, permitting its displacement either empty and loaded, without requiring efforts on the part of its user. It advantageously possesses load lifting means (66) for the purpose of permitting placement of load (P) on the dolly, either automatically or manually.

According to a preferred embodiment of the invention, each of the side-frames (3, 4) forming the sets of wheels is thus composed of two quide-plates (3, 3a–4, 4a) establishing between them a space "e" in which are mounted in rotation three wheels, namely one front wheel (5, 8), one rear wheel (7, 10) and one intermediary wheel for pivoting (6, 9), said wheels being mounted on the transverse axes of rotation (XX'), (YY') and (ZZ') traversing said guide-plates.

According to a complementary characteristic of the invention, the end wheels in the front and/or the rear (5, 7–8, 10) of the side-frames (3, 4) are arranged between the guide-plates (3a, 3b–4a, 4b), forming them, according to the space between axes (ZZ', XX') so that they extend from said guide-plates on both sides to form buffer stops. For that reason it is preferable to have rubber wheels, which contributes equally to comfort of use while affording a shock absorbing effect of vibrations during the course of a displacement.

According to this preferred embodiment, the means of connecting the side frames (3, 4) with the cross-pieces (11, 12) are formed by four vertical tie-rods (13) cooperating with one of the extremities (11a, 11b–12a, 12b)—said cross-pieces (11, 12) freely predisposed beneath the side-frames (3, 4) in perpendicular direction to the former. In this manner, they are brought, at time of assembly of the dolly (1), in contact with the lower edges (3c, 3d–4c, 4d) of the guide-plates (3a, 3b–4a, 4b) of said side-frames (3, 4) when there is tractive action on the free ends (13a) of the tie-rods (13), while being supported by the upper edges (3e, 3b–4e, 4f) of these same guide-plates after they have passed through the "e" space which they define. More precisely, each of the tie-rods (13) is formed, on the one side, by an upper threaded portion, realized at the free end (13a) for the purpose of cooperating with the upper edges (3e, 3f–4e, 4f) of the guide-plates (3a, 3b–4a, 4b) of the side-frames (3, 4), and, on the other side, by a portion in the shape of a ring (13b) realized at the opposite end and intended for free insertion of the extremities (11a, 11b–12a, 12b) of the cross-pieces (11, 12). In addition, the support to the free ends (13a) of each of the tie-rods (13) against the upper edges (3e, 3f–4e, 4f) of the guide plates (3a, 3b–4a, 4b) of the side-frames is provided by means of an intermediary flange (14), extending transversely to same, the tightening of which is done by the action of a nut (15) engaging with the threaded portions of said extremities (13a).

According to another characteristic of the invention, there is provided a locking device (67) which permits the immobilization of the cross-pieces (11, 12) relative to the side-frames (31) when they are stabilized by the skew of the connection means (64). Thus, the lower edges (3c, 3d, –4c, 4d) of each of the four guide-plates (3a, 3b–4a, 4b) which form the two side-frames (3, 4), contain in their end zones two indentations (16), —said indentations can be beneficially arranged vis-a-vis each other according to two parallel axes and perpendicular to said side-frames (3, 4) so as to assure the placement and locking of the cross-pieces (11, 12) in transverse position when there is traction upon the connecting tie-rods (13).

These indentations (16) which form the placement and locking device (67) can be in the shape of an inverted "V" or also in shape of an inverted "U" or in any other appropriate shape.

Preferably, and as illustrated in FIGS. 6, 6a, 7 and 8, the elements which make up the dolly (3, 4, –11, 12) are, in fact, assembled according to load deposit (P) on a support table (17) placed on the ground, the two cross-pieces (11, 12) being introduced into the extremities (13b) of the two respective tie-rods (13) which are then placed in upward traction, causing the lift of the load (P) in relationship to the wheels (5 to 10) of the side-frames (3, 4) supported on the ground (S). According to this execution mode, the placement in traction is obtained thanks to load lifting means (66).

One comprehends well the full significance of the invention, as cited already in the preface, based on the fact that the load is lifted by the construction of the dolly itself, which is effected directly relative to said load (P) placed in expectation on the ground (S). Lifting is done in generally parallel fashion, —the risk of tilting and tipping of the dolly (1) is thereby avoided.

Needless to say, one can likewise imagine that the elements which make up the dolly (1) might also be assembled prior to depositing the load (P) on the cross-pieces (11, 12) with or without intermediacy of a support plate (17).

According to this preferred realization mode, the pivoting means (61) and the tilting means (62) are made up by the intermediary pivoting wheels (6, 9), said intermediary pivoting wheels (6, 9) are arranged between the end wheels (5, 7–8, 10) of each of the side-frames (3, 4), disposing of means of articulation capable of permitting, upon demand, their alignment relative to the other two, or of rendering them retractable between the guide-plates (3a, 3b–4a, 4b) of said side-frames (3, 4) or, inversely, of lowering them relative to the other two, in such manner so as to cause a tilting effect of said dolly, facilitating clearance of an obstacle during displacement of the load (P) as well as pivoting of said dolly.

In fact, the intermediary wheels (6, 9) are mounted on a pivoting manipulation arm, which can be operated manually or electrically.

Figure 9:
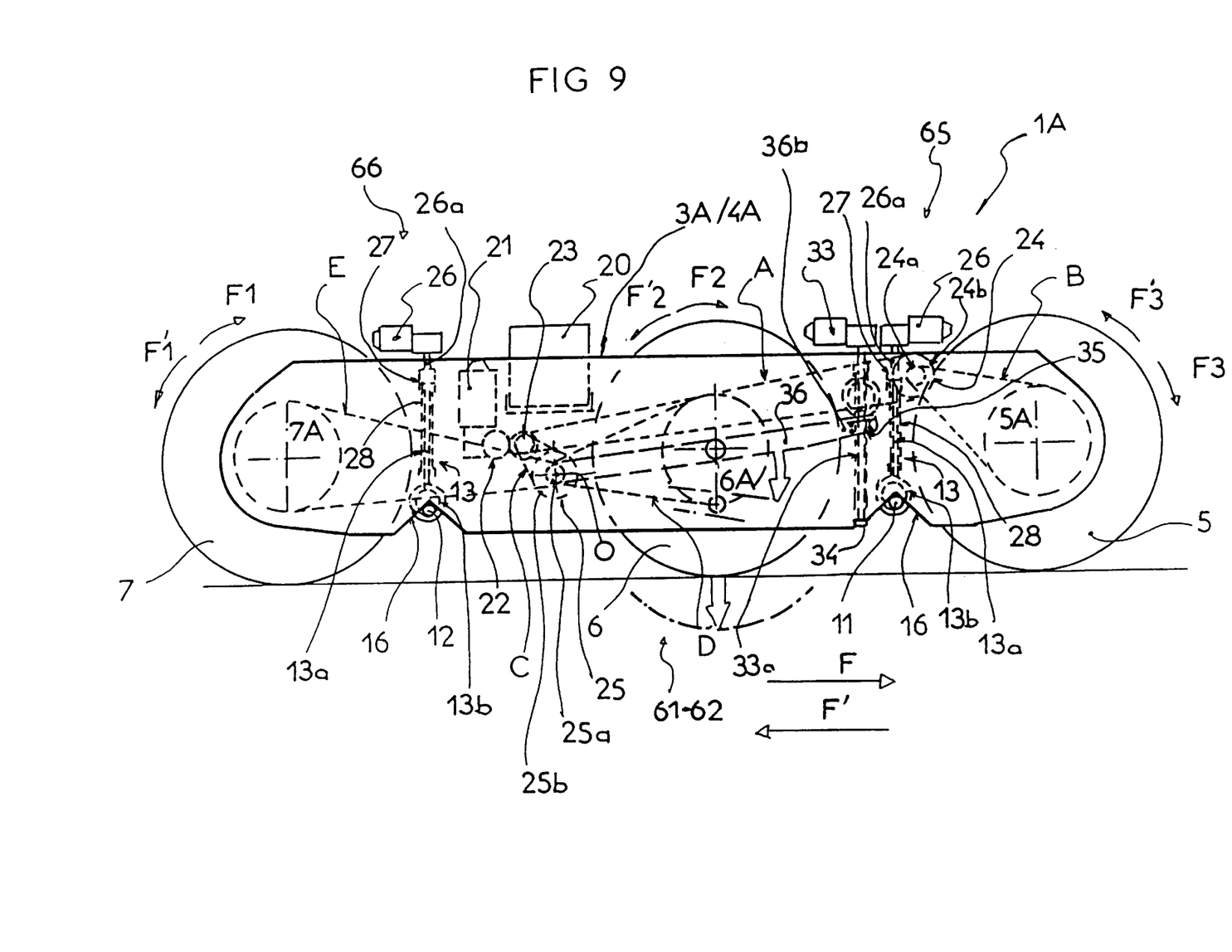
FIG. 9 is a schematic view of the dolly, according to the preceding figures, equipped with means of propulsion, to make it self-propelling.

According to the embodiment example of the execution mode illustrated in FIG. 9, the dolly (1A) comprises propulsion means made up by at least one electrical motor (21) fed by a battery (20) and mechanically connected with at least two drive wheels, respectively facing each other on each side-frame (3, 4–3A, 4A).

In fact, in this case, each of the side-frames (3A, 4A) has a single drive reducer motor (21) with one exit wheel (22) connected to a planet wheel (23), driving:
 a first chain (A) arranged on the first step (24a) of a first turn-pulley (24), the second step (24b) of which, with a lesser diameter, is connected to the axle (SA) of a first wheel (5) of side-frame (3A) with the aid of a second chain (B); a third chain (C), arranged on the first step (25a) of a second turn-pulley (25), whose second step (25b) with a lesser diameter, is connected, on the one side, with the axle (6A) of a second wheel (6) of side-frame (3A) with the aid of a fourth chain (D), and, on the other side, with axle (7A) of a third wheel (7) of the side-frame (3A) with the aid of a fifth chain (E)—the ratio of the diameters of the drive wheel (22) of the reducer motor (21), of the planet wheel (23) of the first and second step (24a, 24b–25a, 25b) of the first return-pulley (24) and the second identical return pulley (25), as well as the axles (5A, 6A, 7A) of the wheels, likewise identical, so as to confer to said wheels the same rate of rotation for displacement of the set according to a given direction, front or rear (F or F').

The direction of rotation of the different elements mentioned above, involving the chains as well as the pulleys and the wheel axles, is indicated by the small arrows running in the direction of rotation, respectively according to F1, F2, F3 and F'1, F'2, F'3 of the wheels (5, 6 and 7).

It is obvious that the description of the motorized side-frame (3A) which is going to be carried out, applies to the same supplementary side-frame (4), connected with wheels (8, 9, 10).

According to the preferred execution mode of the invention, as illustrated in FIG. 9, the tractive action on each of the tie-rods (13) of the same side-frame (3A or 4A) is carried out with the aid of load lifting means (66) made up by a power reducer (26), whose output shaft (26a) is equipped with rotational driving means (27) of a threaded cylinder (28) with which the free end (13a) of the tie-rod (13), likewise threaded, cooperates in such manner that the rotational drive of the cylinder (28) by means of power reducer (26) on the threaded portion (13a) of tie-rod (13), previously immobilized from turning by a cross-piece (11 or 12) inserted in its end ring (13b), causes an ascending or descending movement of said cross-pieces (11 or 12).

Figure 10:
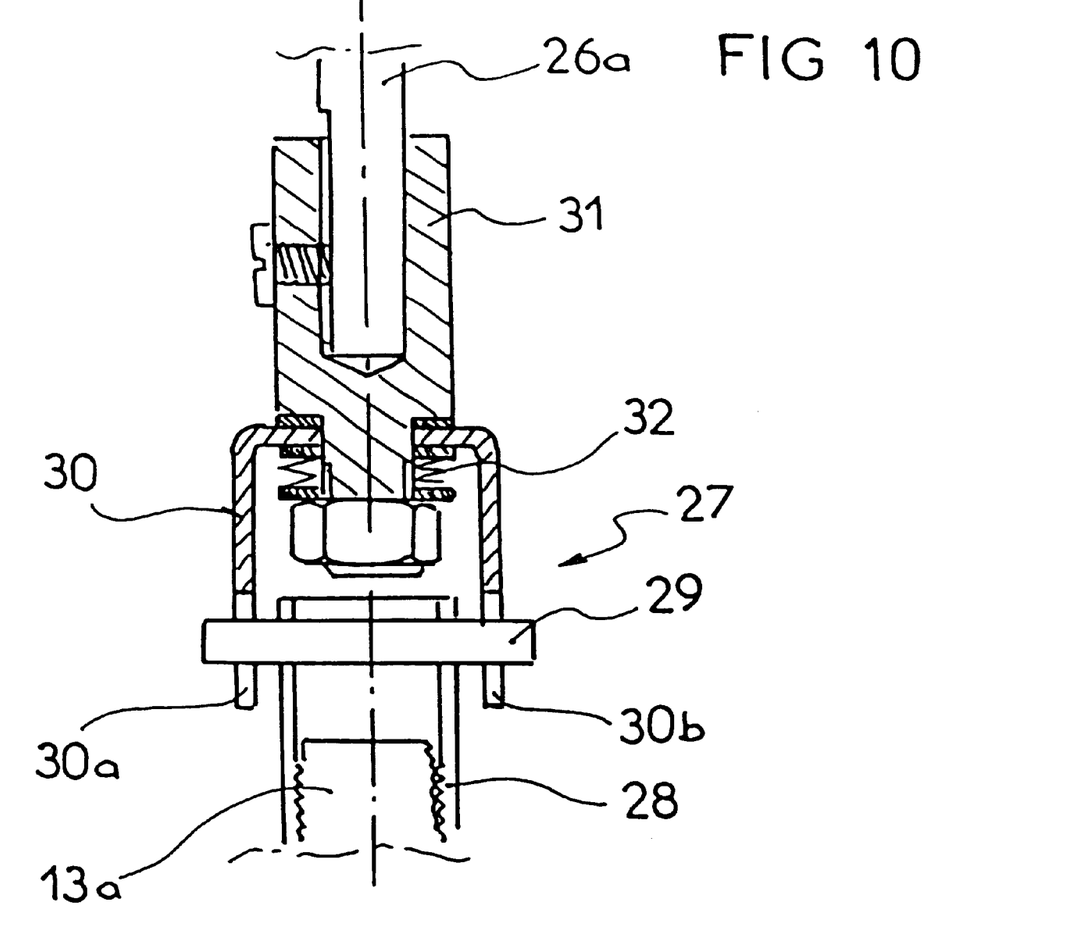
FIG. 10 is a view of the details indicating the attachment means between a power-driven reducer and one of the attachment organs of the elements between them.

These means are represented in larger scale in FIG. I 0, in which one notes an execution example of the rotational driving means of the cylinder (28) made up by a transverse pin (29), going through the upper end of same and forks (30a and 30b) positioned on the emerging portions, with the end of the tines forming one piece in the shape of an inverted "U" (30) in integral rotation with a connecting organ (31) located between the "U" piece and the end of the exit axle (26a) of the power reducer (26) with the aid of a stack of elastic washers, constituting a couple limiter (32).

According to another characteristic of the invention, the manipulation of the intermediary wheel (6, 9) of each of the side-frames (3A, 4A) toward a position of retraction or descent relative to a standard position of alignment with the other two (5, 7, or 8, 10), is performed with the aid of a power reducer (33) whose output shaft is connected to a threaded rod (33a) mounted in rotation in a fixed cage (34), realized on a lower portion of the side-frame (3A, 4A) and cooperating with a likewise threaded hole (35), arranged at one end (36b) of operating arm (36) which turns with its other end on a fixed articulation point (0) and carries in its center (O') the transverse axle of said intermediary wheel (6, 9). Note that the retraction and descent of the intermediary wheel of each of the side-frames permits better clearance of possible obstacles, such as steps or slopes. We are adding also that pivoting of the loaded dolly is made possible by dropping of the intermediary wheels (6, 9) as is illustrated with mixed properties in FIG. 9. The connection means between the drive axle of the power reducer (33) and the threaded rod (33a) is beneficially of the same type as those previously described for the tie-rods and represented in FIG. 10.

Preferentially, the fixed articulation point (0) of the manipulation arm (36) of the intermediary wheels (6, 9) merges with a support axle, on which is mounted in rotation the second drive pulley (25) of said intermediary wheel (6, 9) also the second wheel and the third wheel (7 or 10) by means of chain returns (DE).

Needless to say, the transmission chains (A, B, C, D, E) can also be replaced by belts.

Finally it should be noted that this self-propelling set permits, when required,
 to simultaneously command the motors (21) of the front or rear means of propulsion of the two side-frames (3A, 4A) or set of wheels,
 to control these independently from each other, i.e. either in the same direction or in the opposite direction.
 to command simultaneously the power reducers (26) of the load lifting means (66).
 to eventually command the unclutching of the propulsion means motors (65).

In addition, the motorization of the load lifting means (66) which permits vertical displacement of the tie-rods (13) and of the manipulation arms (36) can be replaced be manual means, such as a crank, —the end of which replaces the end of the exit shaft of the power reducers , which would then be withdrawn, without, however, going beyond the protective scope claimed by the invention.

Figure 11:
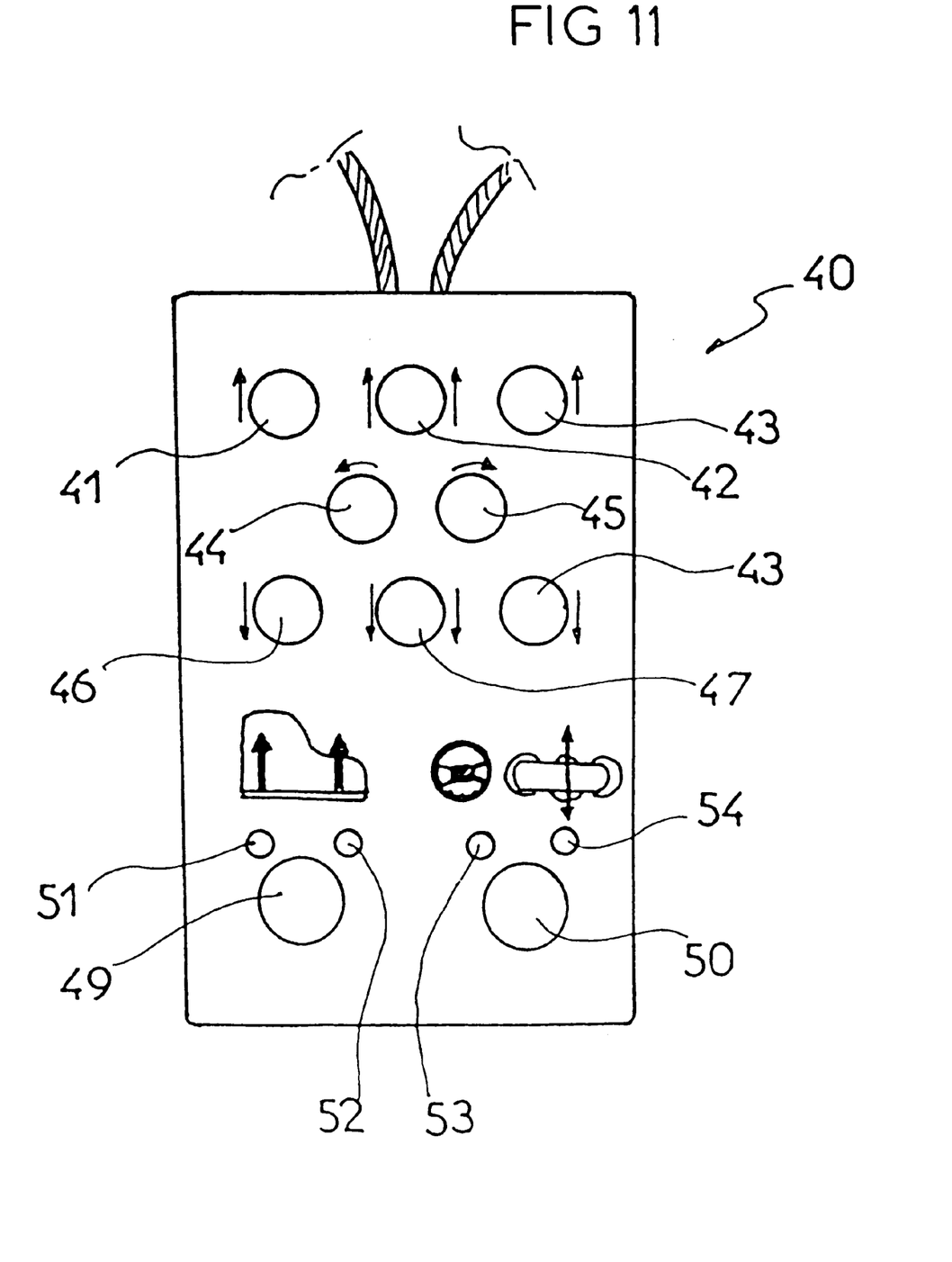
FIG. 11 represents a control box, given by way of example.

It should also be noted that a control box (40) can be provided, comprising a set of control buttons (41, 42, 43, 44, 45, 46, 47, 48, 49, 50) as well as indicator lights (51, 52, 53, 54) said box being connected to two side-frames. The buttons (41, 42, 43, 44, 45, 46, 47, 48) for example are intended to control the different motors, button (45) being intended to control the lifting and descent of the front and rear tie-rods, and button (50) controls the motors intended for propulsion and for control of the manipulation arms (36)—said button (50) being of the two-position type, one position for control of propulsion and one position for control of the arms, the two positions being identified by two electro-luminescent diodes (53, 54). Note, that beneficially the two buttons (41, 42) of the second row operate with respect to all motors. It goes without saying that one can also provide for remote control by radio, without going beyond the scope of the invention.

We are adding that a "stabilizing bracket" can also be provided for each of the side-frames in order to make sure that they are held in vertical position, permitting convenient positioning of the cross-pieces.

Figure 1:
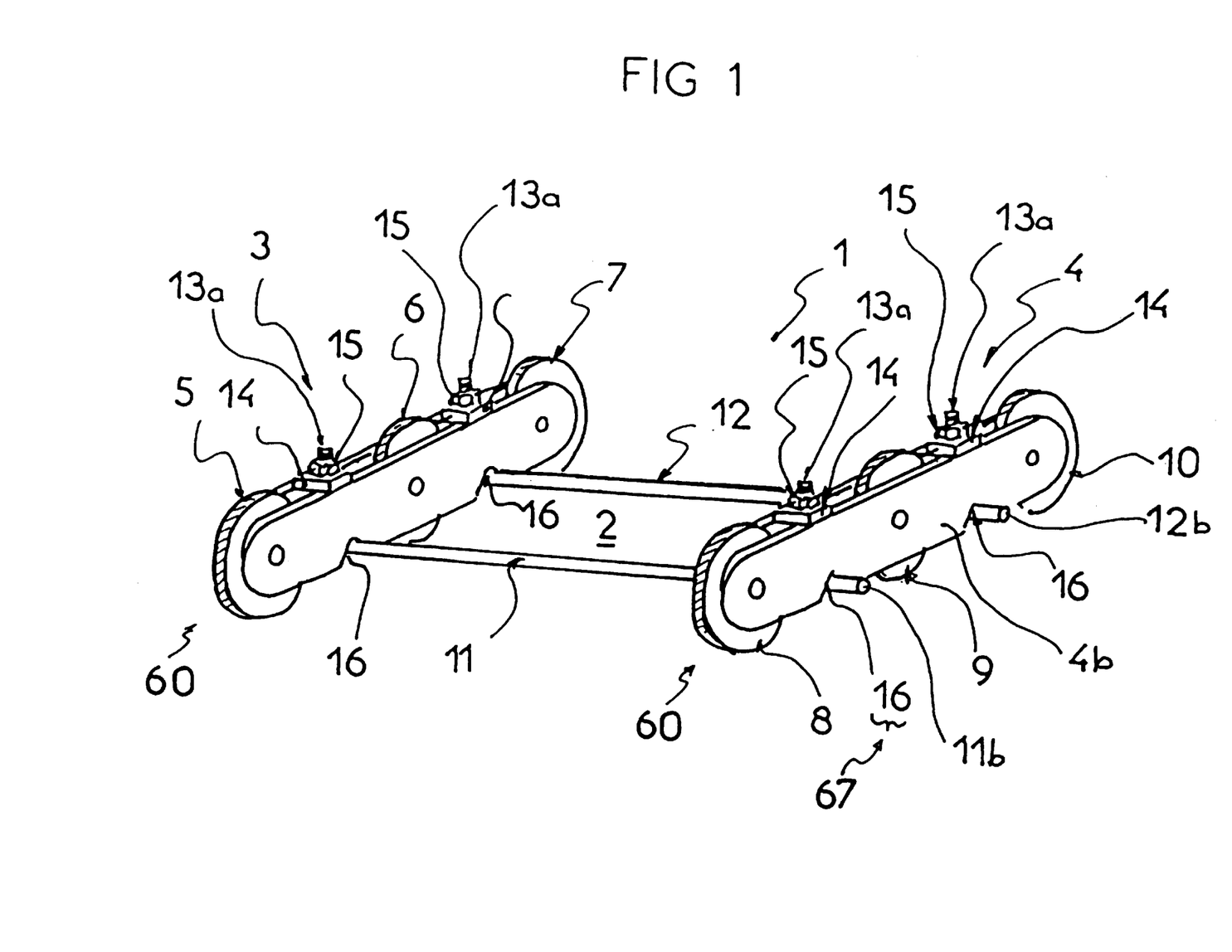
FIG. 1 is a perspective view of a load handling dolly according to the invention, after assembly of its components.
Figure 2:
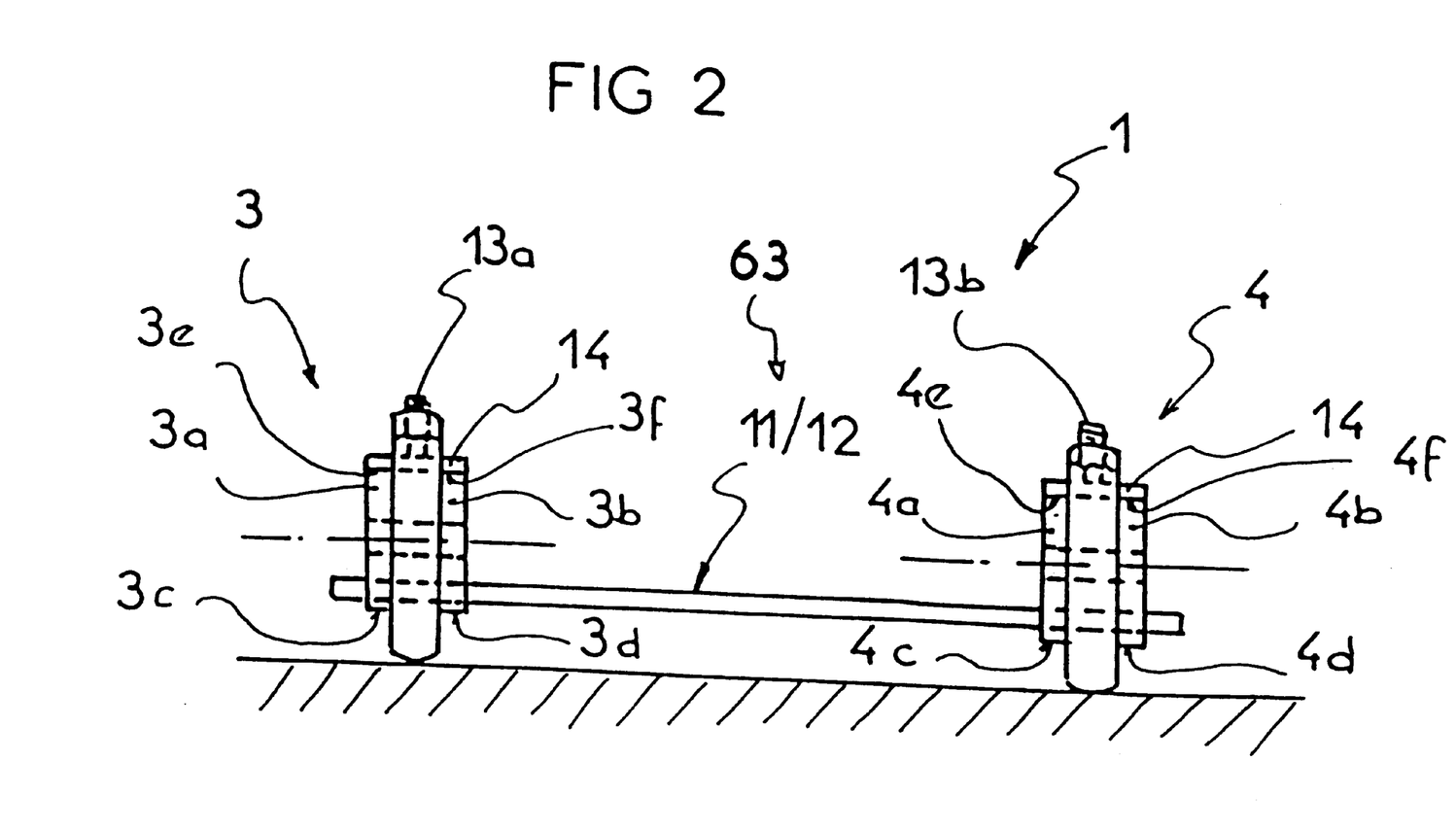
FIG. 2 is an end view of a dolly according to FIG. 1.
Figure 3:
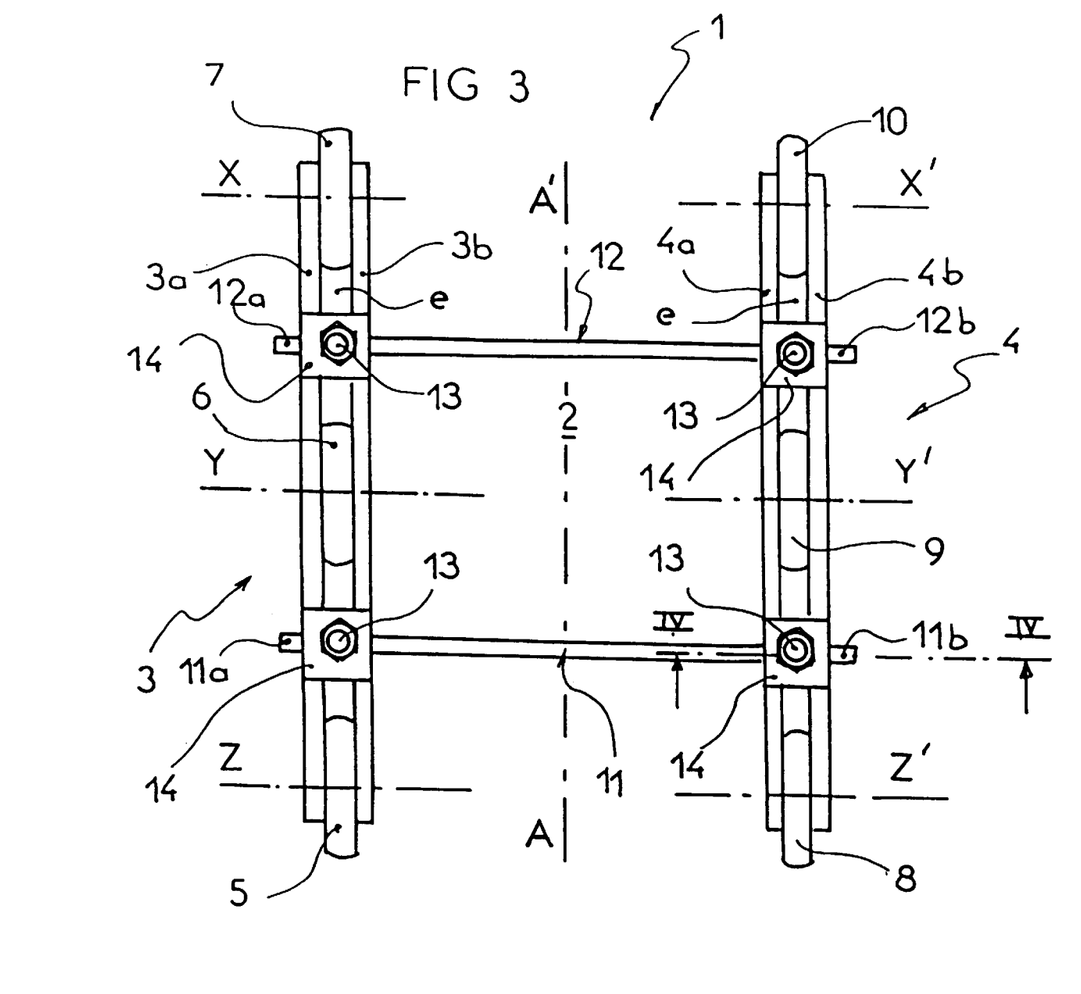
FIG. 3 is a top view of the same dolly according to FIG. 1.
Figure 4:
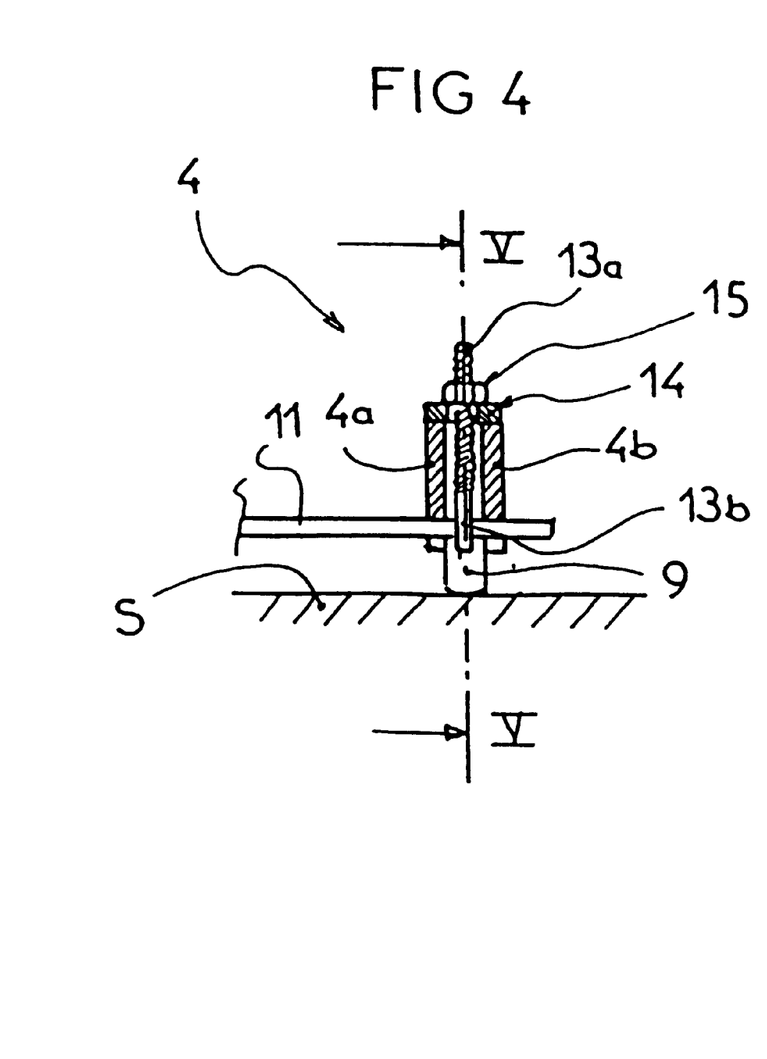
FIG. 4 is a sectional view according to line IV—IV of FIG. 3.
Figure 5:
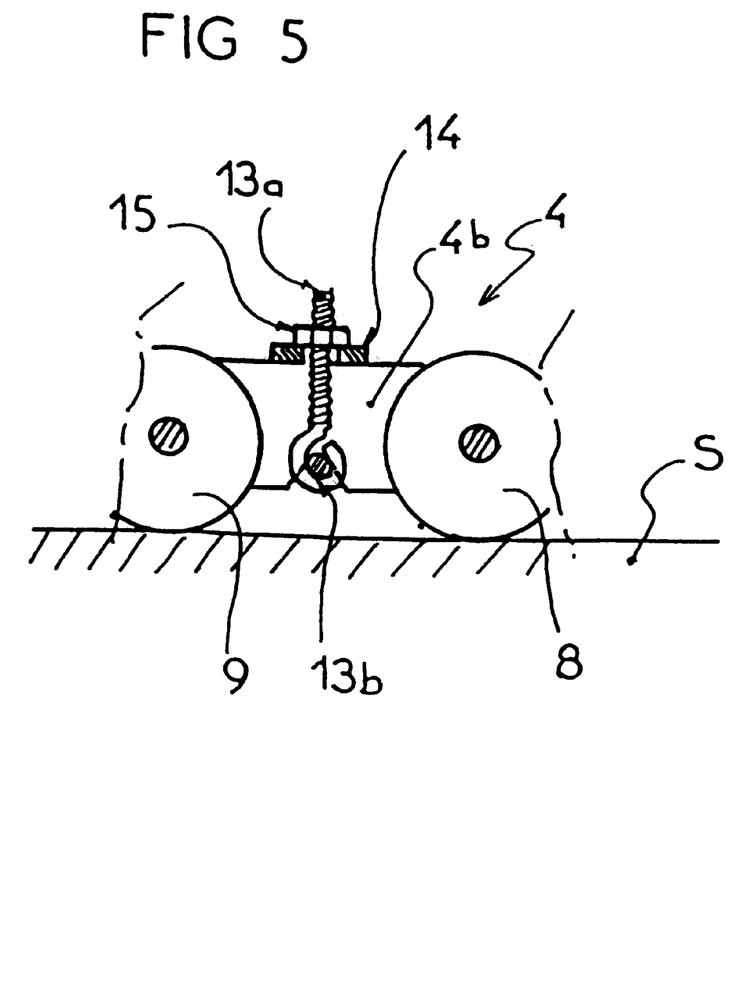
FIG. 5 is a sectional view according to line V—V of FIG. 4.
Figure 6:
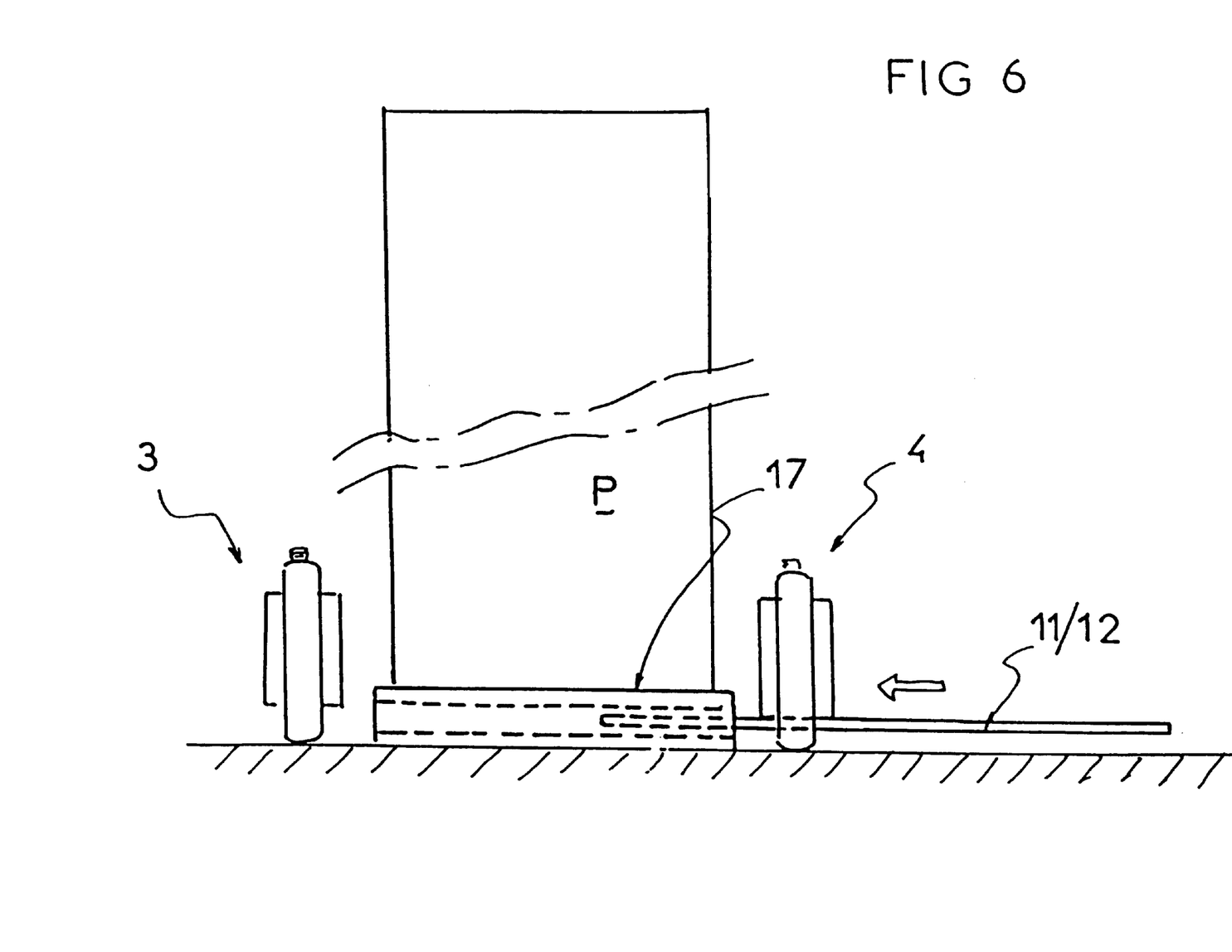
FIG. 6 is an end view of a condensed assembly of the dolly, according to FIGS. 1 to 5, in relationship to a previous load in place on a pallet.
Figure 6A:
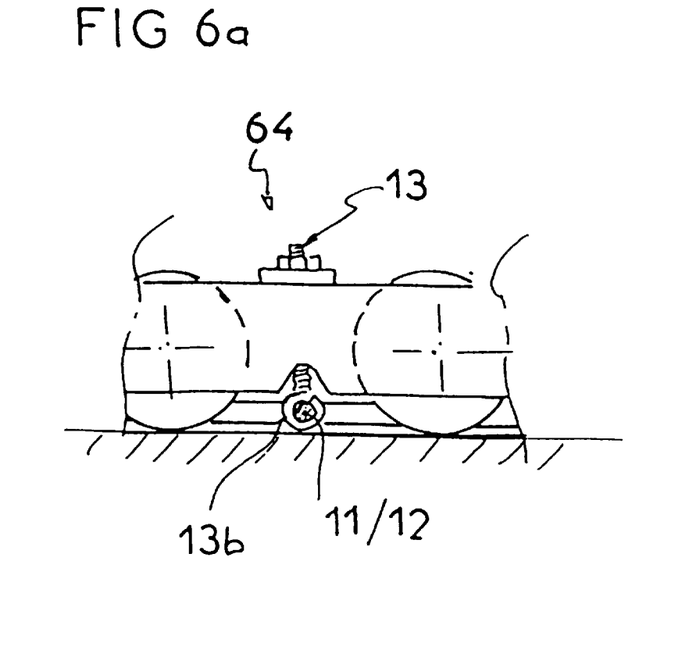
FIG. 6a is a partial lateral view of FIG. 6.
Figure 7:
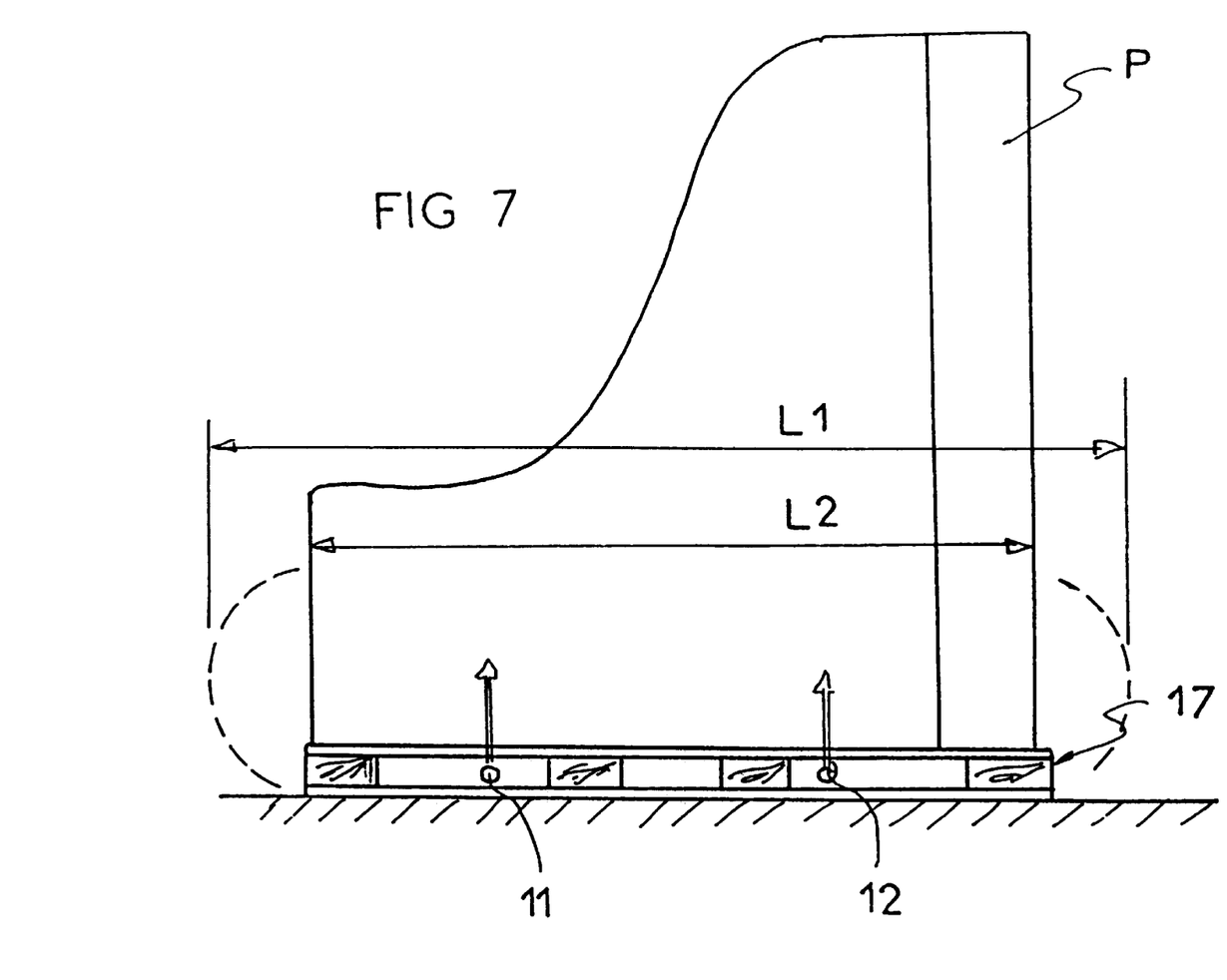
FIG. 7 is a sectional view according to line VII—VII of FIG. 6.
Figure 8:
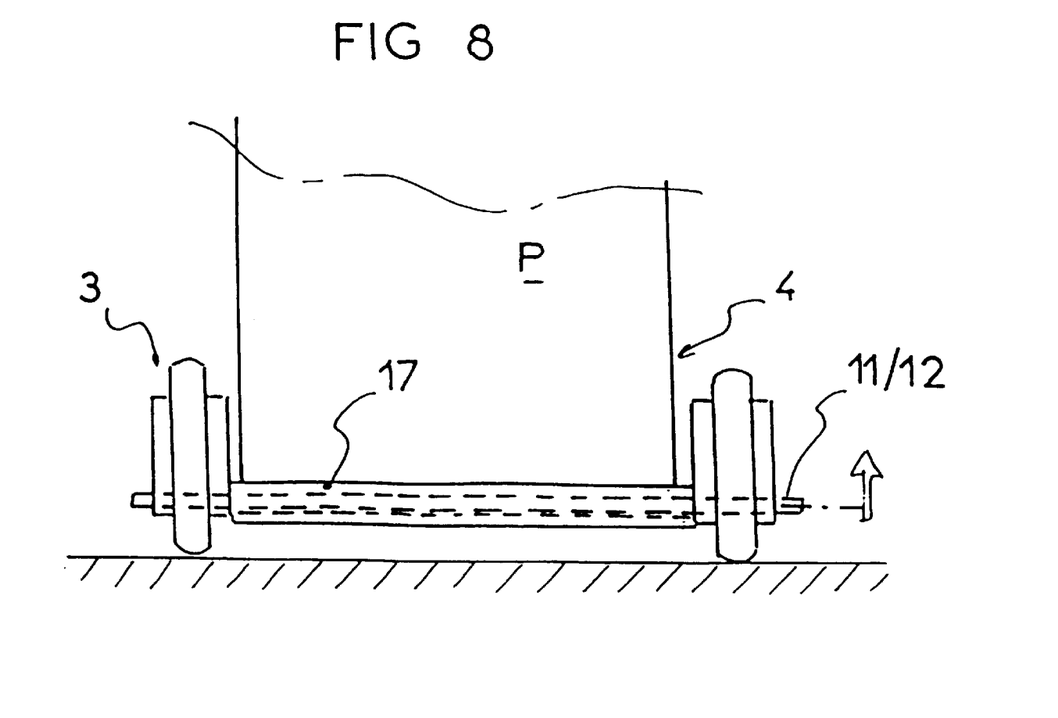
FIG. 8 is a view according to FIG. 6, after assembly of the elements of the dolly and lifting of load.

Also to be noted that the wheels at the end extend beyond the load which is to be transported, as it appears in FIG. 7, from which is apparent that the overall length (L1) of the dolly is larger than the length of the load (L2) which makes it possible to protect said load from eventual shocks.

In addition, the intermediary wheels (6, 9) are beneficially arranged facing each other according to an axis transverse to the center of gravity of the load that must be moved. Thus, in the execution mode given by way of example, the intermediary wheels (6, 9) are not exactly arranged in the center of the side-frames, as can be seen more precisely in FIG. 9, but rather more closely to one of the end wheels.

It goes without saying that one can provide a pivoting "bracket or brace" for each side-frame, permitting that each maintains vertical position before and during the installation of the cross-pieces.

It is understood that the invention is not limited to the execution modes described and represented by way of example, but that it also includes all equivalent techniques as well as their combinations.

I claim:

1. A load handling dolly for transporting a load comprising:
    first and second separate and detached lateral side-frames for positioning independently parallel to each other on opposite sides of a load and parallel to a longitudinal axis of the load, the side-frames each having a front wheel and a rear wheel, and framing which interconnects the front and rear wheels of each side-frame without interconnecting the first and second side frames to each other;
    at least two cross-pieces which are independently positioned transversely under the load between the side-frames, each of the cross-pieces being independently and detachably connected to the side-frames to interconnect the side frames into a unitary construction with the load supported therebetween on the cross-pieces during transport.

2. The load handling dolly according to claim 1 wherein each of the side-frames includes:
    parallel guide-plates positioned longitudinally and establishing between them a space in which the wheels are rotatably mounted on corresponding transverse rotation axes traversing the guide-plates.

3. The load handling dolly, according to claim 1 further including:
    a load lifting device for raising the load on the dolly.

4. The load handling dolly according to claim 3, wherein the load lifting device includes:
    a power reducer initiating tractive action of each of the tie-rods which are coupled to each of the side-frames, respectively, the initiating being done through use of an output shaft with a rotational driving means having a threaded cylinder which cooperates with the threaded upper portion of the tie-rods wherein the rotational drive means with the threaded cylinder initiated by the power reducer on the threaded upper portion of the tie-rod, previously immobilized from rotation by the cross-pieces inserted in the ring-shaped portion of the tie rod, either lifts or descends the cross-pieces.

5. The load handling dolly according to claim 3 wherein the load lifting means includes a tie rod which is threaded on an upper portion and is tightened by a nut against a flange located on an upper edge of a guide-plate of the side-frame.

6. The load handling dolly according to claim 1 further including:
    a pivoting and tilting device for allowing the dolly to pivot, to change directions and to tilt around a slightly transverse axis to allow the dolly to clear an obstacle during transport of the load.

7. The load handling dolly according to claim 6, wherein the pivoting and tilting device includes:
    two intermediary pivoting wheels rotatably mounted and facing each other on each of the side-frames, where the intermediary wheels are located between the front wheel and the rear wheel and an articulation means to align each of the intermediary wheels relative to the front and rear wheels; and,
    a means for retracting the intermediary wheels between the guide-plates of said side-frames and for lifting the intermediary wheels relative to the other two.

8. The load handling dolly, according to claim 1 further including:
    a means for propulsion including at least one electrical motor powered by a battery, the electrical motor being connected mechanically with at least two driving wheels facing each other in each side-frame.

9. The load handling dolly according to claim 1 further including a load lifting means including:
    elements which carry the cross pieces adjacent lower ends and which are threaded adjacent upper ends, the elements being vertically movable relative to the side frames;
    threaded members which threadedly engage the threaded upper ends of the elements and which are cammed by the threaded engagement to lift the elements relative to the side members.

10. A load handling dolly for transporting a load including a longitudinal displacement device for displacing the dolly along a rectilinear trajectory parallel to a longitudinal axis, the longitudinal displacement device including:
    lateral side-frames disposed longitudinally parallel to the longitudinal axis, the side-frames each supported on at least a front wheel and a rear wheel;
    at least two cross-pieces disposed transversely between the side frames being independently and detachable connected to the side frames,
    a connection means for connecting the side-frames with the cross-pieces to make the side frames solid, between themselves at a time of transport, the connecting means including:
        at least four tie-rods each cooperating with one of two ends of the cross-pieces freely pre-disposed beneath the side-frames; and
        a device for causing the tie-rods to draw the cross-pieces into contact with lower edges of the side frames.

11. The load handling dolly according to claim 10, wherein:
    the tie-rods are threaded on an upper portion for cooperation with thread elements and upper edges of the guide-plates of the side-frames and the tie-rods have a ring-shaped portion at their opposite ends for receiving ends of the cross-pieces.

12. A load handling dolly for transporting a load such as a piano, the dolly comprising:
    first and second lateral side frames each supported on at least front and rear wheels, the first and second side frames being independently positionable in a parallel relationship on opposite sides of the load;

first and second cross bars which are each independently inserted transversely below the load and below the first and second side frames;

lifting mechanisms mounted to each side frame for lifting the first and second cross bars to concurrently (1) lift the load and (2) lock each of the first and second cross bars to the side frames such that the side frames are interconnected into a unitary conveyance by the cross bars locking to the side frames.

* * * * *